Inventor:
Jacob J. Vienneau,
His Attorney.

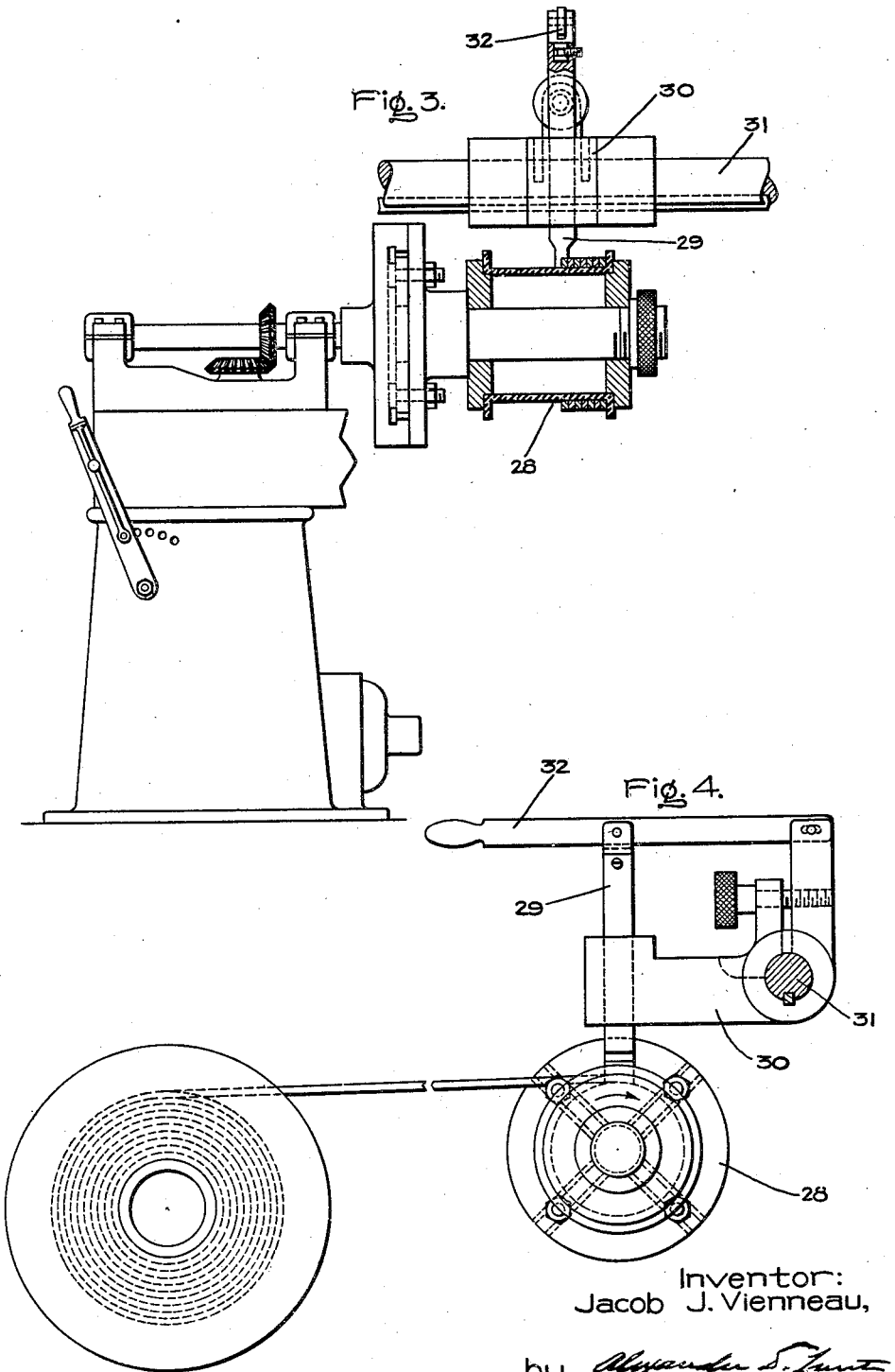

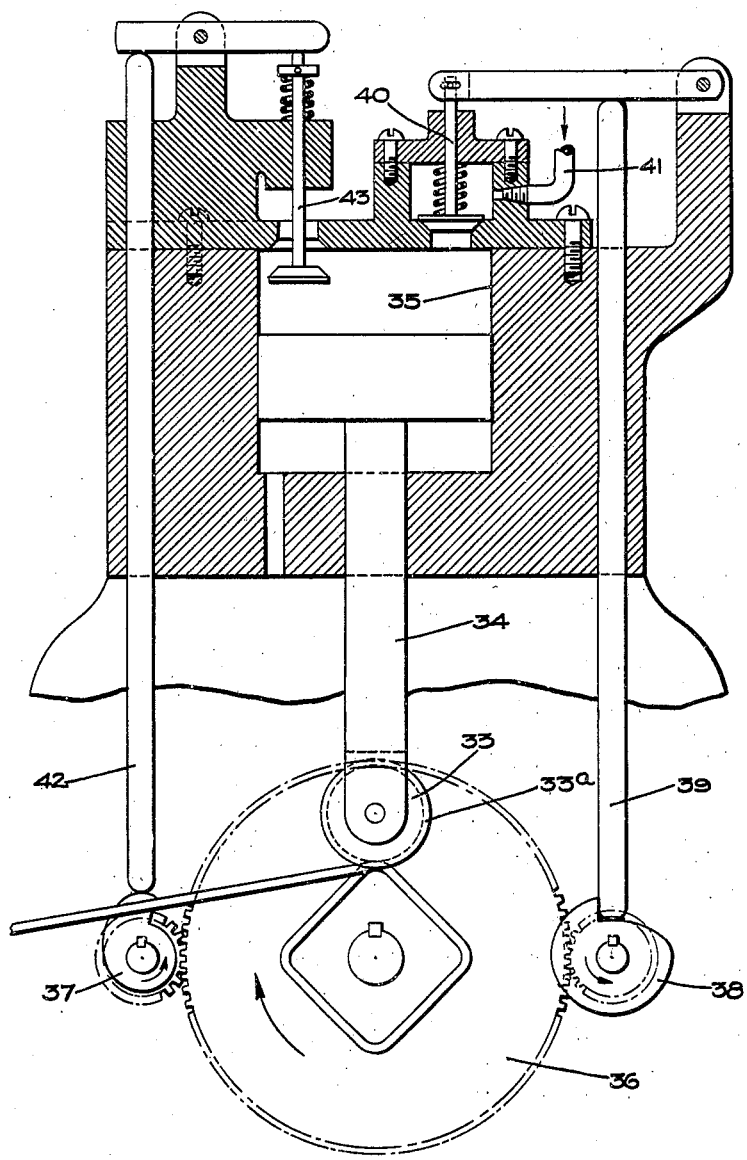

Patented Aug. 4, 1931

1,817,884

UNITED STATES PATENT OFFICE

JACOB J. VIENNEAU, OF PITTSFIELD, MASSACHUSETTS, ASSIGNOR TO GENERAL ELECTRIC COMPANY, A CORPORATION OF NEW YORK

COIL WINDING APPARATUS

Application filed August 8, 1927. Serial No. 211,357.

My invention relates to apparatus for winding insulated electrical conductors and the like into coils and has for its object the provision of means whereby the turns are compacted as the coil is wound and the size of the coil thereby reduced.

In carrying out my invention in one form, I provide a pressure device which applies radially and axially directed forces to the wire as it is wound on the coil, whereby the turns are compacted and at the same time a relative axial movement is produced between the pressure device and the coil as the winding of the layer proceeds.

Figure 1:
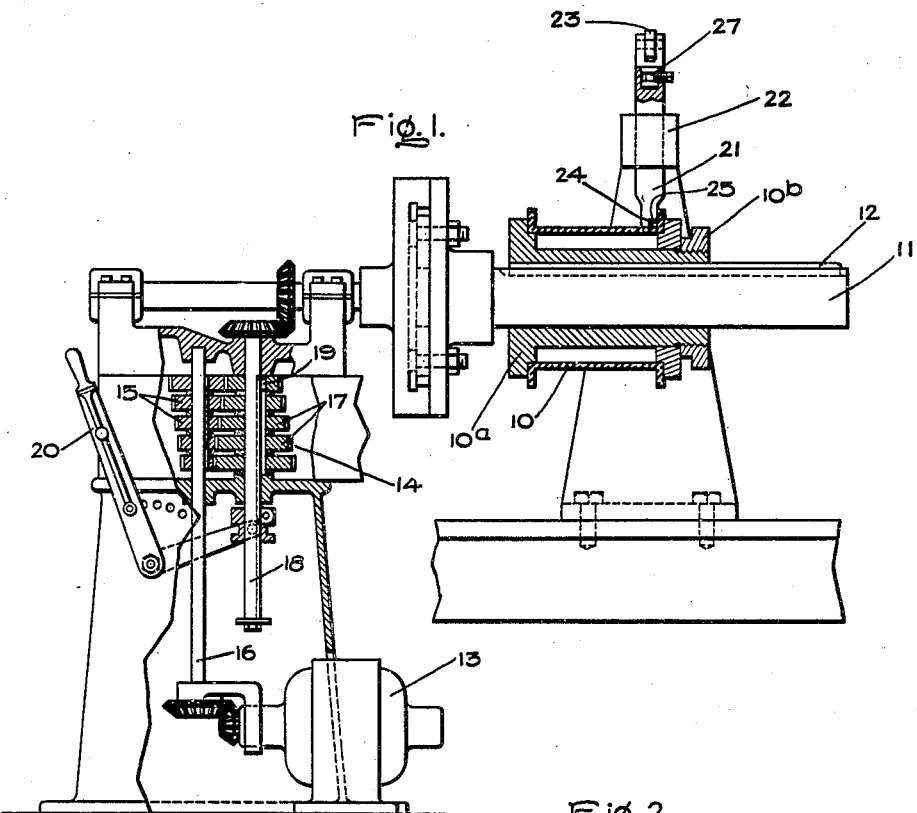
Figure 2:
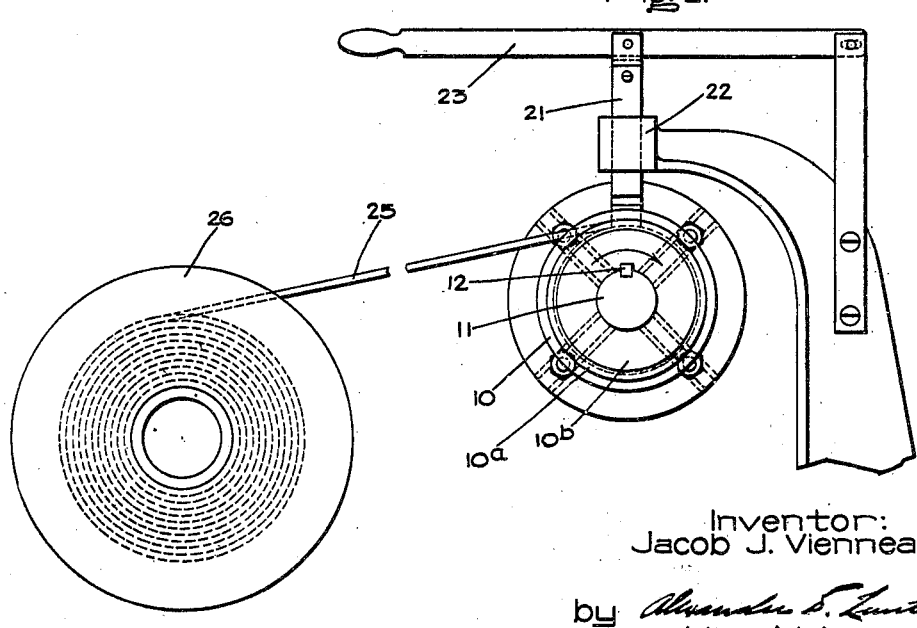

For a more complete understanding of my invention reference should be had to the accompanying drawings in which Fig. 1 is a view partly in section of apparatus for winding coils embodying my invention; Fig. 2 is a fragmentary end elevation view of the device shown in Fig. 1; Figs. 3 and 4 are views corresponding to Figs. 1 and 2 showing a modified form of my invention; while Fig. 5 is a fragmentary view mainly in section showing a modified form of my invention.

Referring to Figs. 1 and 2 of the drawings, in one form of my invention the spool 10 on which the coil is to be wound is mounted on a spindle or mandrel 11 so as to be secured against rotation on the spindle but free to slide in an axial direction thereon. For example, the spool may be secured against rotation by means of a key 12, the spool however being loosely mounted on the spindle and key so as to be slidable on the spindle. As shown the spool is mounted on a support which in turn is slidable on the spindle, this support comprising a sleeve 10ª slidable on the spindle but secured against rotation thereon by the key 12, and the spool being held between two clamping rings, one of which is removable, secured on the sleeve 10ª by a nut 10ᵇ whereby the spool may be removed. The spindle may be driven in any suitable manner such, for example, as by an electric motor 13 which is connected to the spindle through suitable gearing including a change speed device 14. This device comprises a plurality of gears 15 of graduated diameters which are secured to a shaft 16 driven by the motor. These gears mesh respectively with gears 17, also of graduated diameters, which are loosely mounted on a counter shaft 18. By means of a slidable key 19, which may be adjusted by means of a lever 20, any one of the gears 17 may be secured to the shaft 18 to give the desired speed for the spindle.

A pressure device or member 21 is mounted in slidable relation to the spool whereby a pressure may be applied to the conductor as it is wound on the spool. This member 21 is shown as mounted in a guide 22 so as to be movable in a substantially vertical path which passes through the axis of the spool. The upper end of the member 21 is pivotally secured to a hand lever 23 by means of which a suitable pressure may be applied. The lower end of the member 21 engages the upper side of the conductor and is provided with a depending portion or flange which engages with the outer side of the conductor, i. e., the side at the end of the layer being wound. As shown in Fig. 1, the lower end of the member 21 is shaped to engage with a square conductor. In effect, one corner of the member 21 is cut away as indicated by the numeral 24 to form a recess for the conductor. Preferably, the lower end of the member 21, including the lower end of the flange portion, is given substantially the same curvature as the curvature of the spool.

In using the device the insulated conductor 25 is fed to the spool from a reel 26 as the spool is rotated. As shown in Fig. 1, the member 21 is situated centrally along the length of the spindle and in starting a layer the spool is slipped along the spindle until the member 21 engages one flange. As shown, the spool is in its extreme position to the left so that the member 21 engages the first turn which is wound, the conductor fitting in the recess 24. The conductor may be guided on to the spool by the operator or by suitable means, as desired. By means of the lever arm 23, a suitable pressure is applied to the member 21 by the operator, whereby the conductor is seated tightly on the spool. Preferably, the conductor is fed to the spool so as to engage the outer periphery of the spool at substantially the same time that it engages the pressure member 21. As the turns are wound on, the wedging action of the conductor against the depending flange portion of the member 21 compacts the turns in an axial direction and forces the spool 10 toward the right along the spindle. When this layer has been completed, the member 21 is reversed by turning it through a 180° angle to reverse the flange portion in order to wind the layer from the left to the right of the coil, a swivel joint 27 being provided in the member 21 for this purpose.

As a result of the radial and axial pressure applied, the turns are compacted in a radial direction and are, furthermore, compacted in an axial direction whereby the coil occupies the smallest possible space.

In Figs. 3 and 4, I have shown a modified form of my invention in which the spool 28 is secured against movement in an axial direction, whereas the pressure device 29 is mounted for movement in an axial direction as the turns are wound. As shown, the pressure member 29 is slidably mounted in a support 30 which is slidable on a rod 31 extending parallel with the axis of the spool. A lever 32 is provided for applying pressure to the member 29, this lever being pivotally mounted on the support 30. It will be understood that with this arrangement the wedging action of the conductor forces the member 29 and with it the carriage 30 in an axial direction, relative movement in an axial direction being thereby effected between the pressure device and the coil.

In the modified form of my invention shown in Fig. 5 I have provided means for automatically applying an intermittent pressure in the winding of flat sided coils, such as square coils. The pressure applying member in this case takes the form of a wheel or roller 33 having a flange 33ª by means of which axial pressure is applied to the conductor. This roller is mounted on a vertical piston 34 moving in a cylinder 35. Secured to the driving spindle of the spool so as to be rotated therewith is a gear wheel 36 to which are geared two cam members 37 and 38. The cam 38 raises and lowers a push rod 39 which actuates an inlet valve 40 whereby the admission of compressed air to the cylinder from the supply pipe 41 is controlled. The cam 37 operates a push rod 42 which controls an exhaust valve 43 for the cylinder.

The object of this arrangement is to apply pressure to the conductor when it is being laid on the sides of the spool but to release this pressure when the conductor is passing over the corners where there is danger of injuring the insulation. The cam 38 is arranged to lift the push rod 39 and thereby maintain the inlet valve 40 open for the admission of compressed air except when the corner of the spool passes under the roller 33, in which position, as shown in the drawings, the push rod is lowered and the valve 40 closed. The cam 37 is arranged to close the valve 43 when the valve 40 is open but to open the valve 43 and release the pressure when the valve 40 is closed. This condition of operation when the roller 33 is passing over a corner with no pressure applied is shown in the drawings. For a square coil as shown, the speed ratio between the coil and the cams will be 4:1 so that the cams will make one complete revolution for each side. In this arrangement, it is contemplated that the spool will be axially movable, as shown in Fig. 1. At the end of each layer the roller is reversed by turning the piston 34, so that the flange 33ª cooperates with the outer side of the conductor.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States is:

1. Coil winding apparatus for electrical conductors and the like comprising a spool, means for rotating said spool and for feeding said conductor thereto, a member for applying a pressure to compact the turns radially as they are wound on said spool, said member and said spool being relatively movable axially of said spool, a flange on said member engaging the side of the conductor so as to compact the turns axially and relatively displace said member and said spool as the turns are wound on, and means reversibly supporting said member so that said member can be reversed at the end of each layer to wind on a new layer.

2. A coil winding apparatus for electrical conductors and the like comprising a spindle, means for rotating said spindle, a spool mounted on said spindle so as to be slidable in the direction of its axis but secured against rotation therewith, means for applying radially and axially directed pressures on each turn as it is wound on the spool whereby the turns are compacted and the spool moved axially along said spindle, and means reversibly supporting said pressure applying means so that said pressure applying means can be reversed at the end of each layer to wind on a new layer.

3. Coil winding apparatus for electrical conductors and the like comprising a spool, means for rotating said spool and for feeding the conductor thereto, a support, a member mounted on said support so as to be movable transversely with respect to the axis of said spool for applying a pressure to compact the turns as they are wound on said spool, said member and said spool being relatively movable in the direction of the axis of said spool, a flange on said member engaging the outer side of the conductor so as to compact the turns axially and relatively displace said member and said spool in an axial direction as the turns are wound, and means reversibly supporting said member so that said member can be reversed to reverse said flange at end of each layer.

4. Coil winding apparatus for electrical conductors and the like comprising a spool, means for rotating said spool and for feeding the conductor thereto, a support, a member mounted on said support for movement radially with respect to said spool, said member and said spool being relatively movable axially of said spool, means for depressing said member so as to apply a pressure to the conductor as it is wound on the spool, and a depending flange on said member engaging the outer side of said conductor to apply an axial pressure to compact the turns and relatively displace said member and said spool as the turns are wound on, and a pivotal connection for said member whereby said member may be reversed at the end of each layer.

5. Apparatus for winding electrical conductors and the like into coils comprising a spool provided with flat sides joined by corners, means for rotating said spool and for feeding the conductor thereto, and means responsive to the rotation of said spool for applying a pressure to said conductor to compact the turns except when said conductor is passing over said corners.

6. Apparatus for winding electrical conductors and the like into coils comprising a spool provided with flat sides joined by corners, means for rotating said spool and for feeding the conductor thereto, a member bearing on said conductor as it is wound on said spool, means for applying a pressure to said member to compact the turns, and means responsive to the rotation of said spool for releasing said pressure when said member passes over a corner of said spool.

7. Apparatus for winding electrical conductors and the like into coils comprising a spool provided with flat sides joined by corners, means for rotating said spool and for feeding the conductor thereto, a member bearing on said conductor as it is wound on said spool, and means controlled by the rotation of said spool for applying a pressure to said member except when said member is passing over said corners whereby the turns are compacted, said member and said spool being relatively movable in the direction of the axis of said spool, and a flange on said member bearing against the side of said conductor as the turns are wound on whereby the turns are compacted axially and said member and said spool moved relatively to each other in an axial direction.

8. Apparatus for winding electrical conductors and the like into coils comprising a spool provided with flat sides joined by corners, means for rotating said spool and for feeding the conductor thereto, a roller bearing on said conductor as it is wound on said spool, said roller and said spool being relatively movable in the direction of the axis of said spool, means for applying a pressure to said roller to compact the turns, means driven by said spool for controlling said pressure means so as to release said pressure when said roller is passing over a corner of said spool, and a flange on said roller bearing against the side of said conductor as the turns are wound on whereby the turns are compacted axially and said member and said spool moved relatively to each other in an axial direction.

In witness whereof, I have hereunto set my hand this 3rd day of August, 1927.

JACOB J. VIENNEAU.